May 14, 1957     C. C. HORSTMAN     2,792,511

ORIENTED-PUNCHING CORES FOR DYNAMO-ELECTRIC MACHINES

Filed March 17, 1954

WITNESSES:

INVENTOR
Clifford C. Horstman.
BY
ATTORNEY

United States Patent Office 2,792,511
Patented May 14, 1957

2,792,511

ORIENTED-PUNCHING CORES FOR DYNAMO-ELECTRIC MACHINES

Clifford C. Horstman, Sharpsville, Pa., assignor to Westinghouse Electric Corporation, East Pittsburgh, Pa., a corporation of Pennsylvania Application March 17, 1954, Serial No. 416,871

4 Claims. (Cl. 310—216)

My invention relates to an improved form of oriented-punching core such as would be applicable for the laminated stator cores of large polyphase generators or the like. There have been a number of previous attempts to accomplish this general purpose, whereby advantage is taken of the benefits which are to be derived from preferred orientation of the magnetic material, by having the grain-orientation approximately matching the flux-direction in both the core and the teeth, which are substatnially at right angles to each other. None of these previous attempts has proved to be economically practicable.

The purpose of my present invention is to provide a different structural assembly which is characterized by a plurality of core-punchings of oriented magnetic sheet-material, and a plurality of separate individual tooth-punchings of oriented magnetic sheet-material, with interlocking joint-parts between the two, which do not require any welding to hold the parts together.

An illustrative form of embodiment of my invention is shown in the drawings, wherein—

Figure 1:
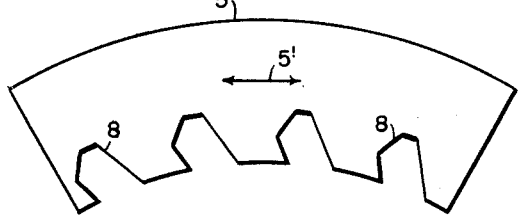
Figure 1 is a plan view of one of my core-punchings.
Figure 2:
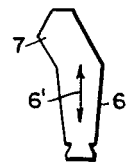
Fig. 2 is a plan view of one of my tooth-punchings.

The core-punchings 5 and the tooth-punchings 6 are punched out from continuous strips (not shown) of oriented magnetic sheet-material, having grain-orientation approximately in the direction of the double-headed arrows 5' and 6', respectively. It will be noted that the grain-direction for the core-punchings 5 is substantially in a longitudinal direction with respect to the punching, so that the circumferentially flowing flux in the core-portion proper of the assembled core will not deviate more than about 15° from the grain-direction. The grain-direction in the tooth-punchings is also in the horizontal direction with respect to the length of the tooth, so that it coincides with the flux-direction in the tooth 6.

The base of each tooth 6 is of a shape suitable for making an interlocking joint with one of the core-punchings 5, and preferably this joint is a miter joint 7, with the miter-joint part extending to only one side of the main body of the tooth, the base of the miter-joint part and the base of the main body of the tooth extending across substantially the full width of the tooth. Each of the core-punchings 5 has a plurality of marginal openings or notches 8 which are suitable for receiving the interlocking-joint parts of a plurality of tooth-punchings 6, for holding said tooth-punchings in place.

Preferably, in any practical form of embodiment of my invention, only two punching-shapes are required, one for all of the plurality of identical core-punchings 5, and one for all of the plurality of identical separate individual tooth-punchings 6. These two punching-shapes can be cut from a continuous strip or strips of oriented magnetizable sheet-material, with a very low scrap-loss, which is an important advantage of my invention.

Figure 3:
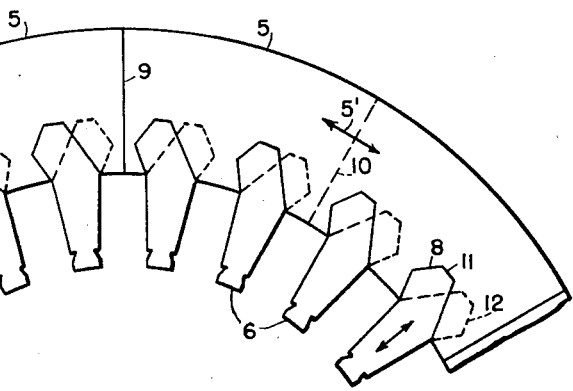
Fig. 3 is a plan or end view of a portion of an assembled stator-core, showing the manner of assembly.

As has previously been known, in the assembly of large laminated cores which did not have the oriented magnetizable material, that the core-punchings 5 should preferably be built in sector-shaped pieces, with abutting ends to make up a complete circumference, as shown in Fig. 3, and with the abutting sector-ends of alternate layers in an overlapping relation, as shown by the full and dotted lines 9 and 10 in Fig. 3, in order to obtain a lapped-joint construction for the core-punchings of successive layers.

In building up a laminated core in accordance with my invention, I preferably reverse alternate layers of interlocked core- and tooth-punchings, in order to obtain a lapped-joint construction at the miter joints of successive layers, as shown by the full and dotted lines 11 and 12 in Fig. 3.

The friction of the butt and lap joints provides strength to keep the core-structure intact, and to prevent any tooth-movement, even under short-circuit stresses, and without requiring abnormally close tolerances and clearances in the punching operations. The overlapping portions of the punchings of successive layers minimize the core and excitation losses at the respective joints.

The result of my construction is what appears to be the most advantageous form of laminated toothed-core construction using grain-oriented magnetizable sheet-material.

I claim as my invention:

1. A laminated core for a dynamo-electric machine, said core being made up of a plurality of identical core-punchings all made of oriented magnetic sheet-material having grain-orientation approximately in the direction of flux-flow in the core-punchings, and a plurality of separate identical individual tooth-punchings all made of oriented magnetic sheet-material having grain-orientation approximately in the direction of flux-flow in the tooth, the base of each tooth being of a shape suitable for making an interlocking miter joint with one of the core-punchings, with the miter-joint part extending to only one side of the main body of the tooth, the base of the miter-joint part and the base of the main body of the tooth extending across substantially the full width of the tooth, and each core-punching having a plurality of marginal openings suitable for receiving the interlocking-joint parts of a plurality of tooth-punchings for holding said tooth-punchings in place, some of the layers of interlocked core- and tooth-punchings being reversed to obtain a lapped-joint construction at the miter joints of successive layers.

2. The invention as defined in claim 1, characterized by the core-punchings being in sector-shaped pieces with abutting ends to make up a complete circumference, with the abutting sector-ends of some of the layers in an overlapping relation to obtain a lapped-joint construction for the core-punchings of successive layers.

3. A laminated core for a dynamo-electric machine, said core being made up of a plurality of identical core-punchings all made of oriented magnetic sheet-material having grain-orientation approximately in the direction of flux-flow in the core-punchings, and a plurality of separate identical individual tooth-punchings all made of oriented magnetic sheet-material having grain-orientation approximately in the direction of flux-flow in the tooth, the base of each tooth being of a shape suitable for making an interlocking miter joint with one of the core-punchings, with the miter-joint part extending to only one side of the main body of the tooth, the base of the miter-joint part and the base of the main body of the tooth extending across substantially the full width of the tooth, and each core-punching having a plurality of marginal openings suitable for receiving the interlocking-joint parts of a plurality of tooth-punchings for holding said tooth-punchings in place, alternate layers of interlocked core- and tooth-punchings being reversed to obtain a lapped-joint construction at the miter joints of successive layers.

4. The invention as defined in claim 3, characterized by the core-punchings being in sector-shaped pieces with abutting ends to make up a complete circumference, with the abutting sector-ends of alternate layers in an overlapping relation to obtain a lapped-joint construction for the core-punchings of successive layers.

References Cited in the file of this patent
UNITED STATES PATENTS

| | | |
|---|---|---|
| 507,689 | Riker | Oct. 31, 1893 |
| 928,037 | Frost | July 13, 1909 |
| 1,033,379 | Burke | July 23, 1912 |
| 2,433,660 | Granfield | Dec. 30, 1947 |